(12) United States Patent
Masoud

(10) Patent No.: US 9,098,079 B2
(45) Date of Patent: Aug. 4, 2015

(54) METHOD OF JOINT PLANNING AND CONTROL OF A RIGID, SEPARABLE NON-HOLONOMIC MOBILE ROBOT USING A HARMONIC POTENTIAL FIELD APPROACH

(71) Applicant: King Fahd University of Petroleum and Minerals, Dhahran (SA)

(72) Inventor: Ahmad A. Masoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 61 days.

(21) Appl. No.: 14/106,040

(22) Filed: Dec. 13, 2013

(65) Prior Publication Data

US 2015/0168939 A1    Jun. 18, 2015

(51) Int. Cl.
*G06F 19/00* (2011.01)
*G05B 19/19* (2006.01)

(52) U.S. Cl.
CPC ............... *G05B 19/19* (2013.01); *Y10S 901/01* (2013.01); *Y10S 901/46* (2013.01)

(58) Field of Classification Search
CPC ... G06N 3/008; B62D 57/032; G05D 1/0274; G05D 1/0246
USPC ......................................................... 700/245
See application file for complete search history.

(56) References Cited

U.S. PATENT DOCUMENTS

| 4,885,515 A | 12/1989 | Kurakake et al. |
| 5,758,298 A | 5/1998 | Guldner |
| 6,046,566 A | 4/2000 | Sonoda et al. |
| 6,608,459 B2 | 8/2003 | Kasagami et al. |
| 6,885,160 B2 | 4/2005 | Takeuchi |
| 7,520,184 B2 | 4/2009 | Uemura et al. |
| 7,872,436 B2 | 1/2011 | Kock et al. |
| 8,256,542 B2 | 9/2012 | Couture et al. |
| 8,442,721 B2 | 5/2013 | Yi et al. |
| 2010/0057252 A1 | 3/2010 | Kim |
| 2013/0105233 A1 | 5/2013 | Couture et al. |
| 2013/0289870 A1* | 10/2013 | Schwartz et al. ............. 701/400 |

FOREIGN PATENT DOCUMENTS

| JP | 2000-308399 A | 11/2000 |
| JP | 2006-227717 A | 8/2006 |

* cited by examiner

*Primary Examiner* — Ian Jen
(74) *Attorney, Agent, or Firm* — Oblon, McClelland, Maier & Neustadt, L.L.P.

(57) ABSTRACT

A method of joint planning and control of a rigid, separable non-holonomic mobile robot using a harmonic potential field approach is provided. A controller, including a processor and memory, may receive parameters of the robot and a plan having a reference velocity field vector. The controller calculates a synchronization signal and a control signal. The control signal is used to synchronize an actual velocity of the robot in order to navigate the robot according to the plan.

17 Claims, 19 Drawing Sheets

METHOD OF JOINT PLANNING AND CONTROL OF A RIGID, SEPARABLE NON-HOLONOMIC MOBILE ROBOT USING A HARMONIC POTENTIAL FIELD APPROACH

BACKGROUND OF THE INVENTION

The present disclosure relates to a method of joint planning and control of a mobile robot.

Mobile robots in related art have the ability to move from one location to another and are not fixed to any one particular location. They are used in a variety of applications to assist or replace humans in performing repetitive or dangerous tasks. They may be configured with different sizes and shapes in order to reach and perform tasks in areas that would otherwise be too small or too large for humans to access. Additionally, mobile robots may be configured to withstand harsh environments that would be too extreme for human beings.

Mobile robots in related art may be configured with different vehicle propulsion mechanisms including wheels, tank treads, tracks, guides, etc. The mobile robots may be manually controlled by an operator to adjust the speed and direction of the robot. Alternatively, the mobile robots may be programmed to follow a set route or pre-specified markers.

More recently, mobile robots in related art may be controlled autonomously. Such robots take into account changing surroundings in order to avoid unknown or unforeseen obstacles or external influences. These robots may include a variety of sensors to detect surrounding landscape and obstacles.

The mobile robots may include electronic hardware to receive inputs and to send outputs to move the robot from one location to another location. The inputs may be sent to the electronic hardware via a wired or a wireless connection. The outputs sent by the electronic hardware may then be used to adjust a position or a direction of the mobile robot.

While there are various sources of guidance (i.e. knowing which direction to move the mobile robot) such as manual operation via a joystick or via an artificial intelligence module, mobile robots in related art are only designed to work with a single type of source of guidance to convert a desired direction of motion into instructions that are then transmitted to wheels of the robot.

Existing actuation techniques in related art do not yield a well-behaved actuation signal, which can lead to sudden changes in wheel velocity and even an instant reversal of wheel rotation. Additionally, existing actuation techniques are generally sensitive to saturation, noise, and uncertainties. As a result, most existing actuation techniques are quite involved and difficult to tune. Moreover, most existing actuation techniques are designed to work only with a specific type of robot.

Examples of an existing actuation technique may include minimizing cost functional or stochastic optimization. Such techniques require more involved mathematical operations and therefore require more expensive and complex processors to implement.

An object of the present invention is to overcome the above mentioned problems and limitations by providing a method of joint planning and control that can work with multiple types of sources of guidance, that is dynamically friendly and can produce smooth wheel rotation, that can be used with different types of robot (i.e. car-like robots, differential drive robots, etc.), and that is robust against saturation, noise, and parameter uncertainties.

BRIEF SUMMARY OF THE INVENTION

A mobile robot may be provided with at least one wheel and a controller including a processor and memory. Joint planning and control of a position of the mobile robot may be achieved through a velocity control approach and/or a torque control approach. In providing a plan to the mobile robot, a control signal may be calculated and generated to synchronize the actual velocity and/or actual torque of the mobile robot. The ability to perform the complex task of joint planning and control at a servo-level, in a provably-correct manner, increases the speed of operation, reduces energy consumption, and leads to a high quality response.

According to one embodiment of the present disclosure a method of controlling a position of a robot, the method comprising: transferring a plan to a controller including a processor and memory, storing the plan in the memory, the plan including a reference velocity field vector; transferring parameters of the robot to the memory of the controller, the parameters including kinematics of motion of the robot; calculating, in the processor of the controller, a synchronization signal, S, based on the parameters of the robot; calculating, in the processor of the controller, a control signal, U, based on the synchronization signal S; and generating, in the processor of the controller, the control signal, U, to synchronize an actual velocity of the robot in order to navigate the robot according to the plan.

According to one embodiment of the present disclosure, the synchronization signal may be a velocity synchronizing signal and the control signal may be a control velocity signal. The parameters of a robot, which may be for a differential drive robot (DDR), may include a radius of the robot's wheels, a width of the robot, a tangential velocity of the robot, an angular speed of the robot, and angular speeds of the robot's respective left and right wheels.

The parameters of a robot, which may be for a front wheel steer robot (FSR), may include a normal distance between a center of a front wheel and an axis of a rear set of wheels, an angular speed of the rear set of wheels, and a steering angle of the front wheel.

According to one embodiment of the present disclosure, the synchronization signal may be a torque synchronizing signal and the control signal may be a torque control signal. The parameters of a robot, which may be for a differential drive robot (DDR), may include a mass of the robot and torque of the robot's respective left and right wheels.

The above joint planning and control methods, which will be described in more detail herein below, are simple and can be implemented using a low-end microprocessor. In particular the joint planning and control methods involve simple mathematical operations that can be performed by a low-end micro-controller or even using hardware electronic circuits. The method is highly resistant to noise and disturbances, is robust even in the presence of robot parameter errors, is robust in the presence of robot actuator saturation. Additionally, joint planning and control at the servo-level provides high speed and agile response.

DESCRIPTION OF THE DRAWINGS

The characteristics and advantages of exemplary embodiments are set out in more detail in the following description, made with reference to the accompanying drawings.

DETAILED DESCRIPTION OF THE INVENTION

Objects, advantages, and features of the exemplary method of controlling a position of a robot described herein will be apparent to one skilled in the art from a consideration of this specification, including the attached drawings.

According to one embodiment of the present disclosure a method of controlling a position of a robot includes controlling the robot using a velocity synchronizing signal. The velocity synchronizing signal may be applied to differential drive robots (DDR) or to front wheel steered robots (FSR). The method of controlling may comprise: transferring a plan to a controller including a processor and memory, storing the plan in the memory, the plan including a reference velocity field vector; transferring parameters of the robot to the memory of the controller, the parameters including kinematics of motion of the robot; calculating, in the processor of the controller, a synchronization signal, S, based on the parameters of the robot; calculating, in the processor of the controller, a control signal, U, based on the synchronization signal S; and generating, in the processor of the controller, the control signal, U, to synchronize an actual velocity of the robot to navigate the robot according to the plan.

Figure 1:
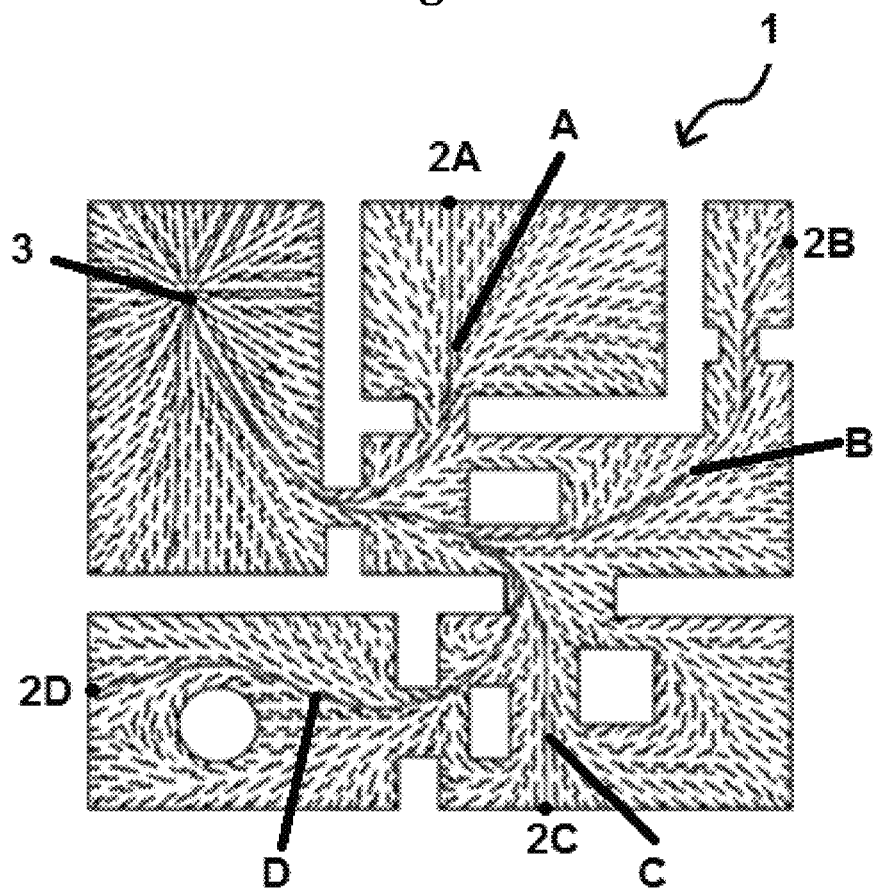
FIG. 1 depicts a plan in the form of a reference velocity field for performing spatial planning action of moving a target while avoiding obstacles.

As shown in FIG. 1, the plan 1 may be in the form of a reference field, $\dot{X}d(X)$. The plan 1 enables the controller to perform spatial planning action of moving the robot while avoiding obstacles. FIG. 1 depicts exemplary starting points 2A, 2B, 2C, 2D, an exemplary finish point 3, and respective trajectories A, B, C, D between the exemplary starting points 2A, 2B, 2C, 2D and the finish point 3.

Figure 2:
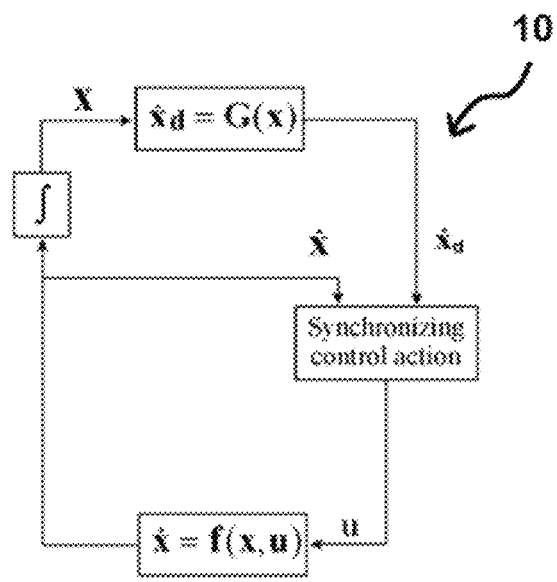
FIG. 2 depicts a block diagram showing the synchronization of the desired velocity field with the mobile robot velocity to perform joint planning and control.

Once a plan 1 has been provided to the controller of the robot, the controller may perform a synchronizing control action 10, as shown in FIG. 2, whereby the desired velocity field from the plan 1 is synchronized with a current velocity of the robot in order to achieve joint planning and control of the mobile robot. A velocity field vector of the plan may be used to guide and instruct the robot as to which direction it should move such that the robot reaches the target in a desired manner. As a result, the velocity field can guide the robot everywhere in a region the robot is supposed to operate, G(x), where x is a point in the region.

In one embodiment relating to differential drive robots (DDR) using a velocity synchronizing signal, the parameters of the robot may be transferred to the controller of the robot. The transfer of the parameters may be performed via a wired or wireless connection. The transfer of the parameters may occur prior to, during, or after the controller is installed on the robot. The parameters of the robot may include a radius of the robot's wheels, a width of the robot, a tangential velocity of the robot, an angular speed of the robot, and angular speeds of the robot's respective left and right wheels.

Figure 3A:
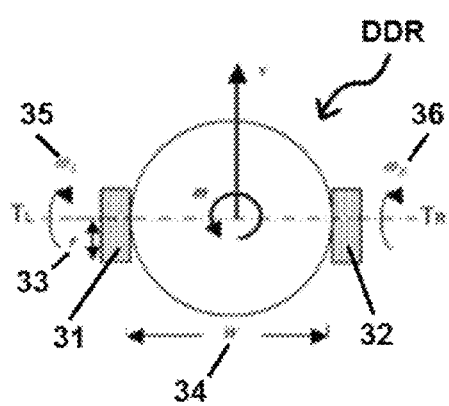
FIG. 3A depicts a differential drive robot (DDR) with associated dimensions and variables.

As shown in FIG. 3A, an exemplary differential drive robot (DDR) may include parameters such as a left wheel 31, a right wheel 32, a radius 33 of at least one of the left wheel 31 and the right wheel 32, a width of the robot 34, and angular speeds of the robot's respective left 35 and right wheels 36. The kinematics of motion of the differential drive robot (DDR) may be described as:

$$\begin{bmatrix} \dot{x} \\ \dot{y} \\ \dot{\theta} \end{bmatrix} = \begin{bmatrix} \cos(\theta) & 0 \\ \sin(\theta) & 0 \\ 0 & 1 \end{bmatrix} \begin{bmatrix} v \\ \omega \end{bmatrix}, \begin{bmatrix} v \\ \omega \end{bmatrix} = \begin{bmatrix} \frac{r}{2} & \frac{r}{2} \\ \frac{r}{W} & \frac{-r}{W} \end{bmatrix} \begin{bmatrix} \omega_R \\ \omega_L \end{bmatrix}, \begin{bmatrix} \omega_R \\ \omega_L \end{bmatrix} = \begin{bmatrix} \frac{1}{r} & \frac{W}{2r} \\ \frac{1}{r} & \frac{-W}{2r} \end{bmatrix} \begin{bmatrix} v \\ \omega \end{bmatrix},$$

where $P=[x\ y\ \theta]^t$, $\lambda=[v\omega]^t$, $U=[\omega_R\ \omega_L]^t$, r is the radius of the robot's wheels, W is the width of the robot, $\omega_R$ and $\omega_L$ are the angular speeds of the right and left wheels of the robot, respectively, v is the tangential velocity of the robot, and $\omega$ is the angular speed of the robot.

Using the parameters transferred to the controller, the processor of the controller may calculate a synchronization signal, S, for the differential drive robot (DDR) based on the parameters of the robot. The calculating may include determining the synchronization signal, S, by:

$$S = \begin{bmatrix} s_1 \\ s_2 \end{bmatrix} = \begin{bmatrix} K1 \cdot |\dot{X}d| \cdot \cos(\arg(\dot{X}d) - \theta) \\ K2 \cdot (\arg(\dot{X}d) - \theta) \end{bmatrix},$$

where K1, K2 are positive constants and $\theta$ is the angle of the robot.

The processor of the controller may calculate a control signal, U, for the differential drive robot (DDR) and the calculating may include determining the control signal, U, by:

$$U = \begin{bmatrix} \omega_R \\ \omega_L \end{bmatrix} = \begin{bmatrix} \frac{1}{r} & \frac{W}{2r} \\ \frac{1}{r} & \frac{-W}{2r} \end{bmatrix} \begin{bmatrix} s_1 \\ s_2 \end{bmatrix}.$$

Additionally, the control signal, U, may be referred to as:

$$U = Q^{-1}(S).$$

The processor of the controller may generate the calculated control signal, U, to synchronize an actual velocity of the differential drive robot (DDR) to navigate the robot according to the plan.

In one embodiment relating to front wheel steer robots (FSR) using a velocity synchronizing signal, the parameters of the robot may be transferred to the controller of the robot. The transfer of the parameters may be performed via a wired or wireless connection. The transfer of the parameters may occur prior to, during, or after the controller is installed on the robot. The parameters of the robot may include a normal distance between a center of a front wheel and an axis of a rear set of wheels, an angular speed of the rear set of wheels, and a steering angle of the front wheel.

Figure 3B:
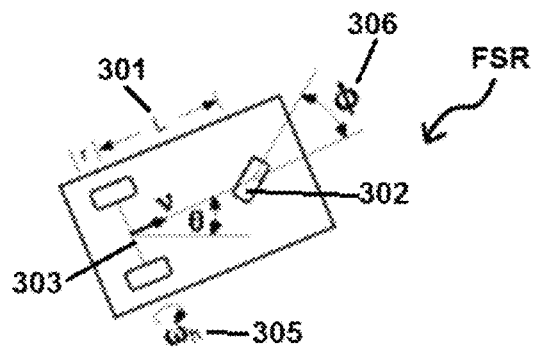
FIG. 3B depicts a front wheel steer robot (FSR) with associated dimensions and variables.
Figure 4:
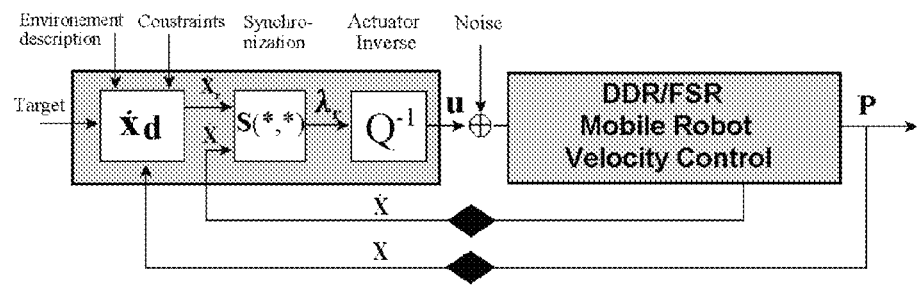
FIG. 4 depicts one embodiment of the joint planning and control structure for velocity control of differential drive robots (DDR) or front wheel steer robots (FSR).
Figure 5:
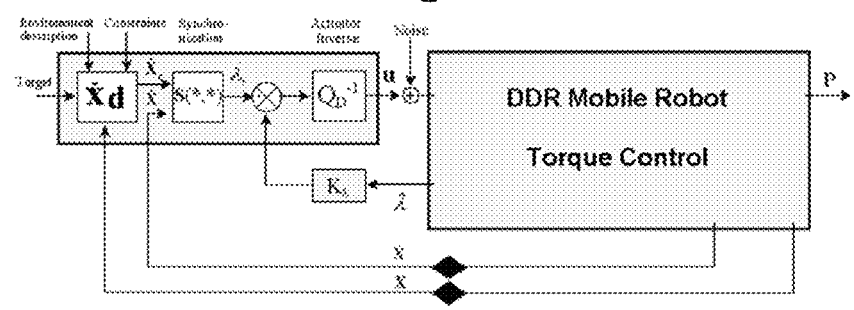
FIG. 5 depicts one embodiment of the joint planning and control structure for torque control of differential drive robots (DDR).

As shown in FIG. 3B, an exemplary front wheel steer robots (FSR) may include parameters such as a normal distance 301 between the center of a front wheel 302 and an axis of the rear wheels 303, an angular speed 305 of the rear wheels 304, and a steering angle 305 of the front wheel 302. The kinematics of motion of the front wheel steer robots (FSR) may be described as:

$$\begin{bmatrix} \dot{x} \\ \dot{y} \\ \dot{\theta} \end{bmatrix} = \begin{bmatrix} \cos(\theta) & 0 \\ \sin(\theta) & 0 \\ 0 & 1 \end{bmatrix} \begin{bmatrix} v \\ \omega \end{bmatrix}, \begin{bmatrix} v \\ \omega \end{bmatrix} = \begin{bmatrix} r \cdot \omega_h \\ r \cdot \omega_h \cdot \frac{\tan(\phi)}{L} \end{bmatrix}, \begin{bmatrix} \omega_h \\ \phi \end{bmatrix} = \begin{bmatrix} v/r \\ \tan^{-1}((\omega \cdot L)/v) \end{bmatrix},$$

where L is the normal distance between the center of the front wheel and the line connecting the rear wheels, $\omega_h$ is the angular speed of the rear wheels, and $\phi$ is the steering angle of the front wheel ($\pi/2 > \phi > -\pi/2$).

Using the parameters transferred to the controller, the processor of the controller may calculate a synchronization signal, S, for the front wheel steer robots (FSR) based on the parameters of the robot. The calculating may include determining the synchronization signal, S, by:

$$S = \begin{bmatrix} s_1 \\ s_2 \end{bmatrix} = \begin{bmatrix} K1 \cdot |\dot{X}d| \cdot \cos(\arg(\dot{X}d) - \theta) \\ K2 \cdot (\arg(\dot{X}d) - \theta) \end{bmatrix},$$

where K1, K2 are positive constants and $\theta$ is the angle of the robot. The processor of the controller may calculate a control signal, U, for the front wheel steer robots (FSR) and the calculating may include determining the control signal, U, by:

$$U = \begin{bmatrix} \omega_h \\ \phi \end{bmatrix} = \begin{bmatrix} s_1 \\ \tan^{-1}(s_2/(L \cdot s_1)) \end{bmatrix}.$$

Additionally, the control signal, U, may be referred to as:

$$U = Q^{-1}(S).$$

The processor of the controller may generate the calculated control signal, U, to synchronize an actual velocity of the front wheel steer robots (FSR) to navigate the robot according to the plan.

According to one embodiment of the present disclosure a method of controlling a position of a robot includes controlling the robot using a torque synchronizing signal. The torque synchronizing signal may be applied to differential drive robots (DDR). The method of controlling may comprise: transferring a plan to a controller including a processor and memory, storing the plan in the memory, the plan including a reference velocity field vector; transferring parameters of the robot to the memory of the controller, the parameters including kinematics of motion of the robot; calculating, in the processor of the controller, a synchronization signal, S, based on the parameters of the robot; calculating, in the processor of the controller, a control signal, U, based on the synchronization signal S; and generating, in the processor of the controller, the control signal, U, to synchronize an actual torque of the robot to navigate the robot according to the plan.

In one embodiment relating to differential drive robots (DDR) using a torque synchronizing signal, the parameters of the robot may be transferred to the controller of the robot. The transfer of the parameters may be performed via a wired or wireless connection. The transfer of the parameters may occur prior to, during, or after the controller is installed on the robot. The parameters of the robot may include a mass of the robot and torque of the robot's respective left and right wheels.

An exemplary differential drive robot (DDR) may include parameters such a mass of the robot, M, a first torque, $T_L$, applied to a left wheel of at least two wheels, and a second torque, $T_R$, applied to a right wheel of the at least two wheels. A first actuation stage of motion of the differential drive robot (DDR) may be described as:

$$\begin{bmatrix} \ddot{x} \\ \ddot{y} \\ \ddot{\theta} \end{bmatrix} = \begin{bmatrix} \cos(\theta) & 0 \\ \sin(\theta) & 0 \\ 0 & 1 \end{bmatrix} \begin{bmatrix} \dot{v} \\ \dot{\omega} \end{bmatrix} + \begin{bmatrix} -\sin(\theta)\dot{\theta} & 0 \\ \cos(\theta)\dot{\theta} & 0 \\ 0 & 0 \end{bmatrix} \begin{bmatrix} v \\ \omega \end{bmatrix}.$$

A second actuation stage of motion of the differential drive robot (DDR) may be described as:

$$\begin{bmatrix} \dot{v} \\ \dot{\omega} \end{bmatrix} = \frac{1}{M} \begin{bmatrix} \frac{1}{r} & \frac{1}{r} \\ \frac{-4 \cdot r}{W^3} & \frac{4 \cdot r}{W^3} \end{bmatrix} \begin{bmatrix} T_R \\ T_L \end{bmatrix}.$$

Using the parameters transferred to the controller, the processor of the controller may calculate a synchronization signal, S, for the differential drive robot (DDR) based on the parameters of the robot. The calculating may include determining the synchronization signal, S, by:

$$S = \begin{bmatrix} s_1 \\ s_2 \end{bmatrix} = \begin{bmatrix} K1 \cdot (|\dot{X}d| - v) \cdot \cos(\arg(\dot{X}d) - \theta) \\ K2 \cdot (\arg(\dot{X}d) - \theta) \end{bmatrix},$$

where v is the tangential speed of the robot, K1 and K2 are positive constants. A damping force $S_D$ may be added to the synchronizing force to ensure stability in the local coordinates of the robot. The calculating may include determining the damping force $S_D$, by:

$$S_D = \begin{bmatrix} KD1 \cdot \eta_1(\dot{X}d, \dot{X}) & 0 \\ 0 & KD2 \cdot \eta_2(\dot{X}d, \dot{X}) \end{bmatrix} \begin{bmatrix} v \\ \omega \end{bmatrix},$$

where, $\eta_1 = 1 - \frac{\dot{X}^t(\dot{X}d)}{\|\dot{X}\|\|\dot{X}d\|} = 1 - \cos(\arg(\dot{X}d) - \theta)$, and $\eta_2 = 1$.

The processor of the controller may calculate a control signal, U, for the differential drive robot (DDR) and the calculating may include determining the control signal, U, by:

$$U = \begin{bmatrix} T_R \\ T_L \end{bmatrix} = M \begin{bmatrix} \frac{1}{r} & \frac{1}{r} \\ \frac{-4 \cdot r}{W^3} & \frac{4 \cdot r}{W^3} \end{bmatrix}^{-1} (S - S_D) = Q_D^{-1}(S - S_D).$$

The processor of the controller may generate the calculated control signal, U, to synchronize an actual first torque, $T_L$, applied to a left wheel of at least two wheels, and an actual second torque, $T_R$, applied to a right wheel of the at least two wheels of the differential drive robot (DDR) to navigate the robot according to the plan.

Next, exemplary simulations are detailed to verify the capabilities of the controller in joint planning and control of the mobile robot. The examples demonstrate the controller's ability to efficiently perform point-to-point movements. The examples also demonstrate the ease in which the controller's parameters can be tuned.

Figure 6:
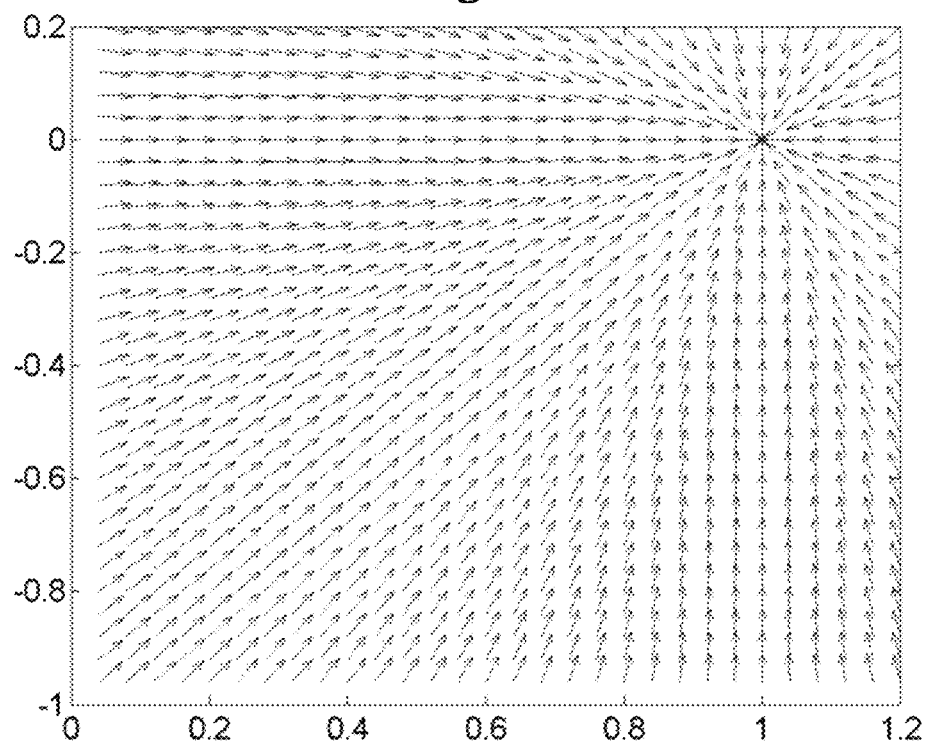
FIG. 6 depicts a guidance field in a free space environment with a target point x=0 and y=1.

In a first exemplary simulation, a front wheel steer robot (FSR) is required to move in free space from an initial position (0,−1) to a final position (1,0). The initial orientation of the robot is π/2. A velocity reference field is shown in FIG. 6 and the velocity of the robot is controlled.

Figure 7:
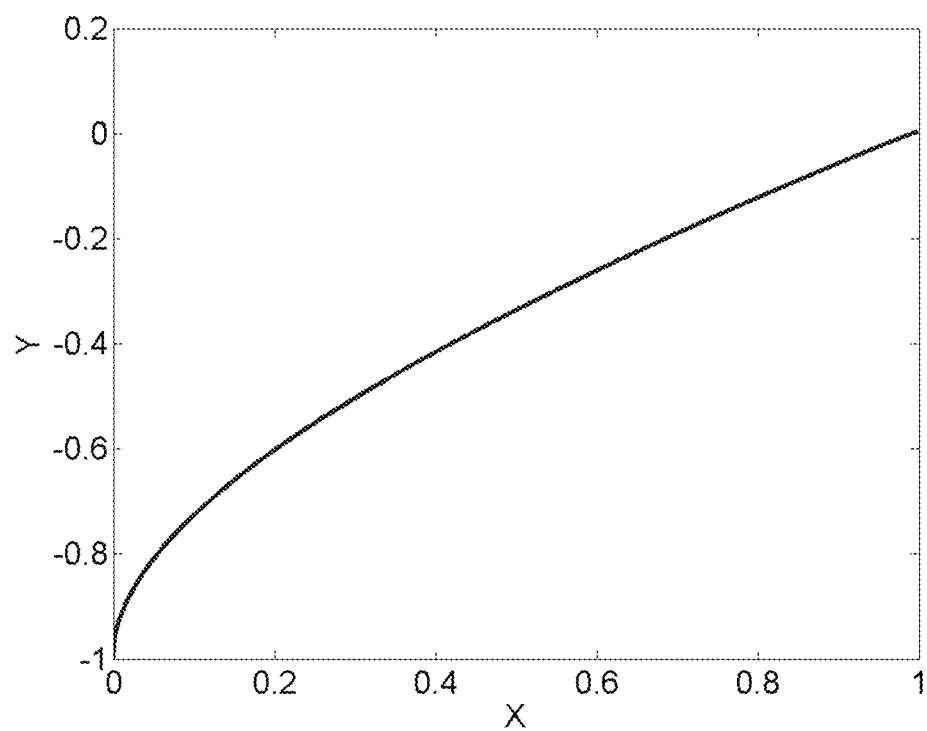
FIG. 7 depicts a spatial trajectory of a kinematic front wheel steer robot (FSR) where K1=1 and K2=4.
Figure 8:
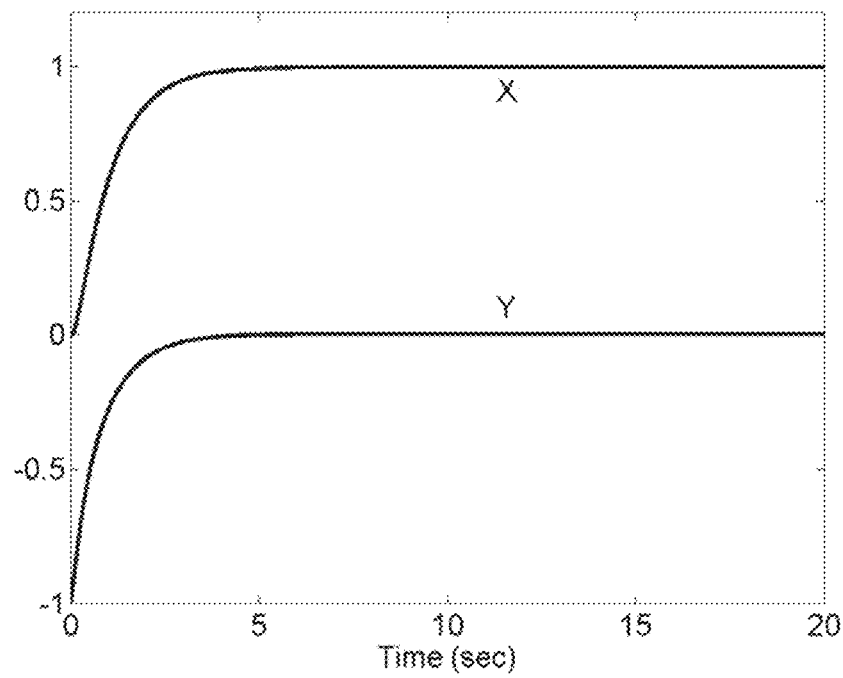
FIG. 8 depicts the x and y components of the spatial trajectory of FIG. 7.
Figure 9:
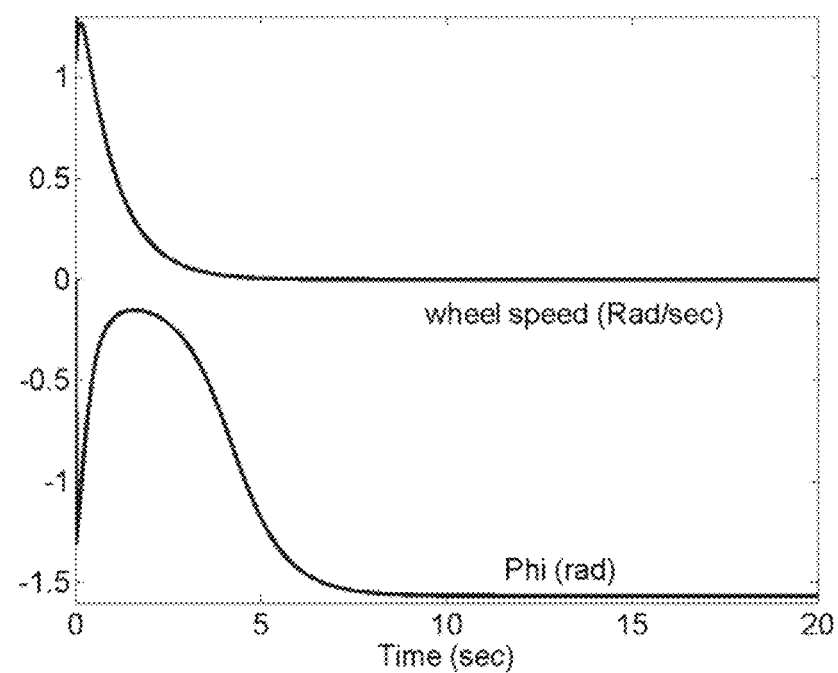
FIG. 9 depicts control signals corresponding to the spatial trajectory of FIG. 7.

The value of the controller's parameters are K1=1 and K2=4. FIG. 7 shows the robot's trajectory and FIG. 8 shows the corresponding x and y components as a function of time. The robot converged to the target in a steady over-damped manner. The well-behaved control signals are shown in FIG. 9.

Figure 10:
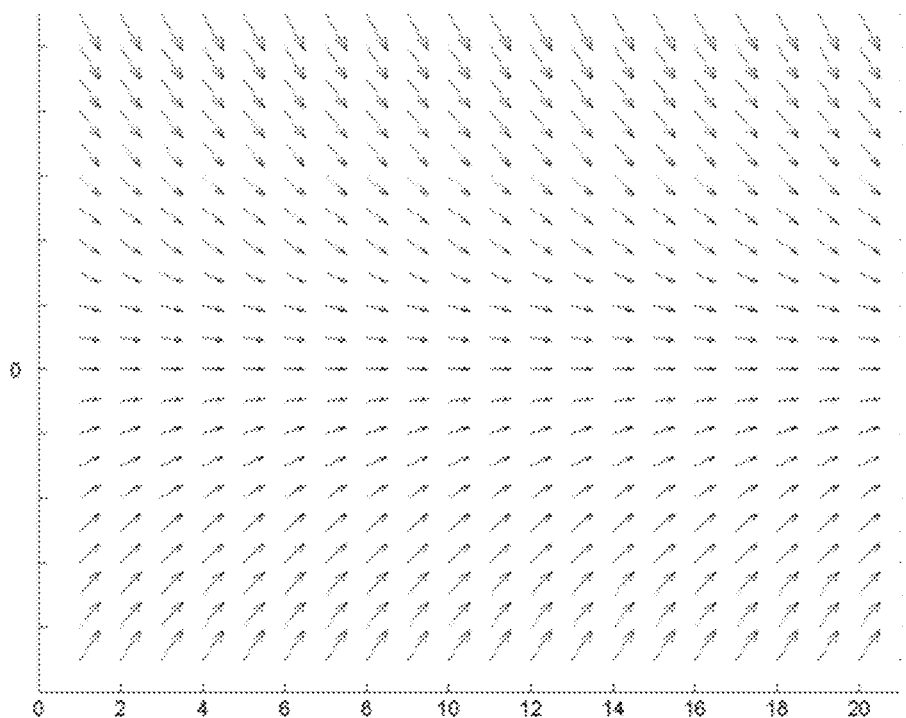
FIG. 10 depicts a gradient guidance field to move along the x-axis and maintain the centerline.

In a second exemplary simulation, the ability of the controller to make a front wheel steer robot (FSR) track a behavior that is encoded in a reference velocity field is demonstrated. A free space environment is used. The initial conditions and the controller parameters are kept the same as in the first exemplary simulation. A gradient guidance field is shown in FIG. 10. The guidance field encodes the behavior: the robot moves along the x-axis at a constant speed and maintains the centerline.

Figure 11:
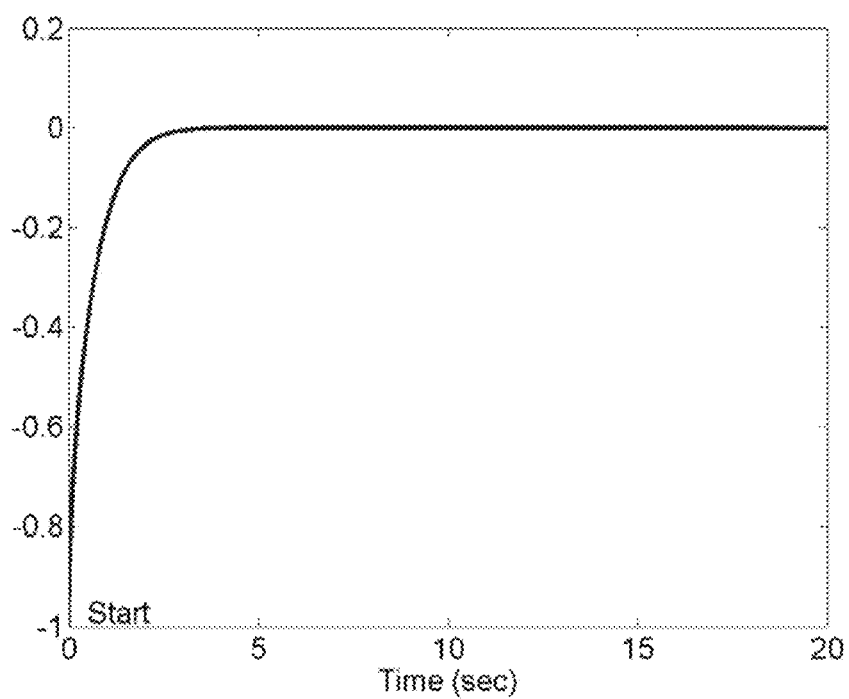
FIG. 11 depicts a trajectory of a front wheel steer robot (FSR) for centerline motion along the x-axis.
Figure 12:
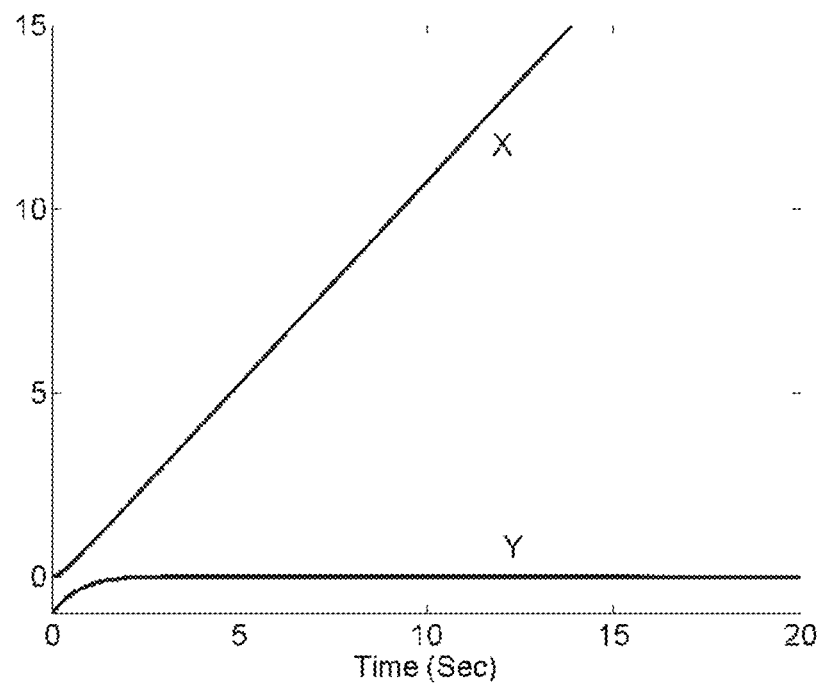
FIG. 12 depicts x and y components of the trajectory of FIG. 11.
Figure 13:
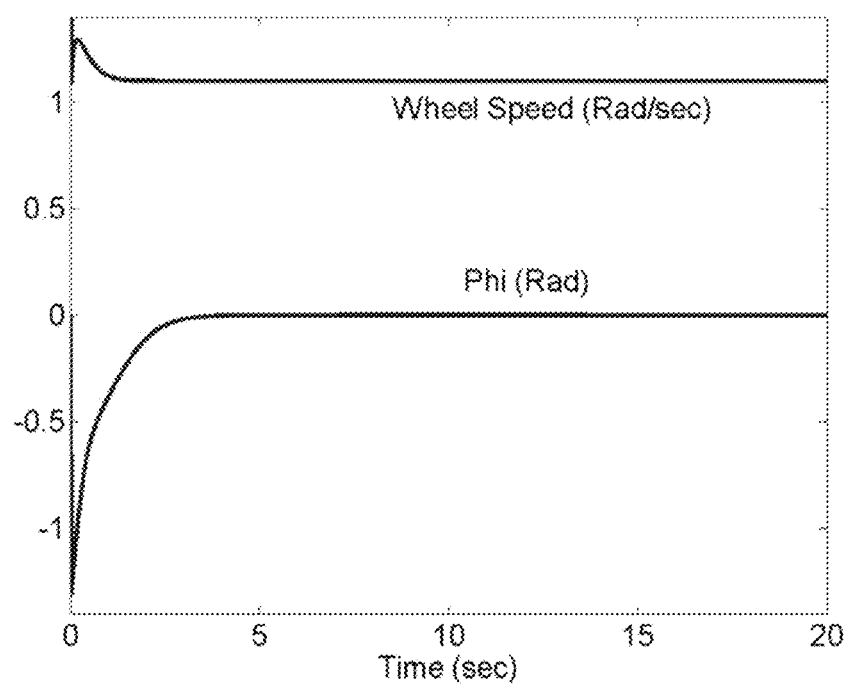
FIG. 13 depicts control signals corresponding to the trajectory of FIG. 11.

The generated trajectory is shown in FIG. 11 and its x and y components are shown in FIG. 12. As can be seen the trajectory converges in a well-behaved manner to the desired trajectory with constant x-velocity and zero y-velocity. The corresponding control signals, shown in FIG. 13, are also well-behaved.

Figure 14:
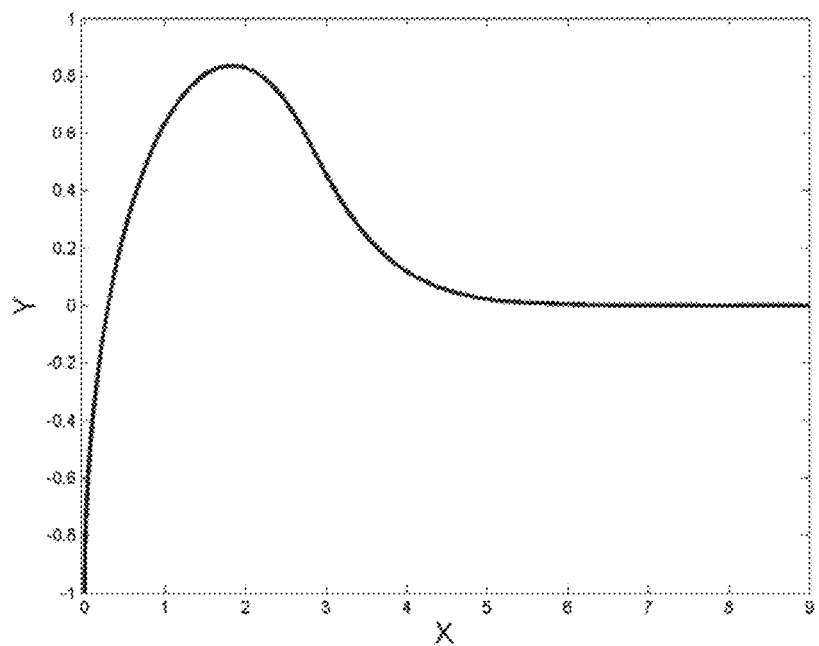
FIG. 14 depicts a trajectory of a front wheel steer robot (FSR) with the addition of saturation and noise.
Figure 15:
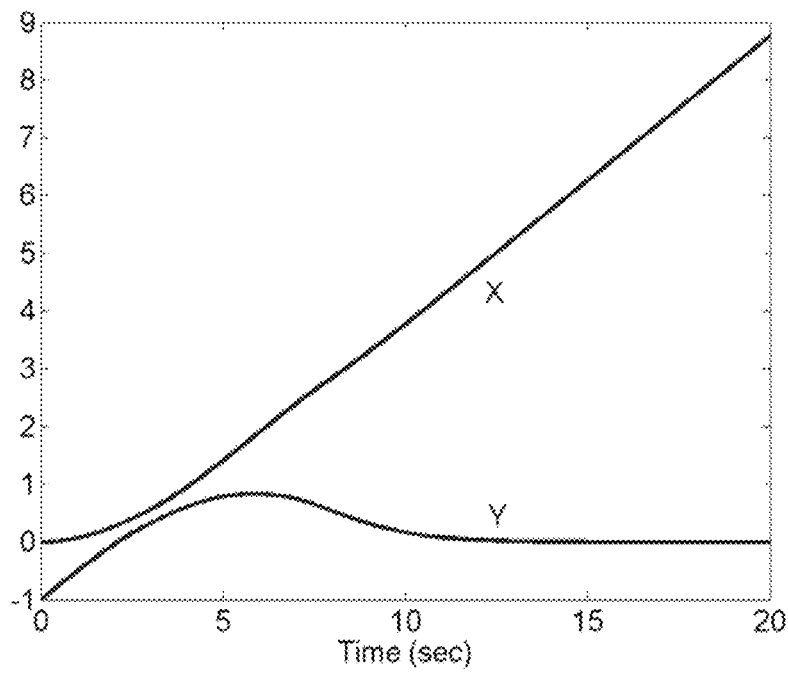
FIG. 15 depicts x and y components of the trajectory of FIG. 14.
Figure 16:
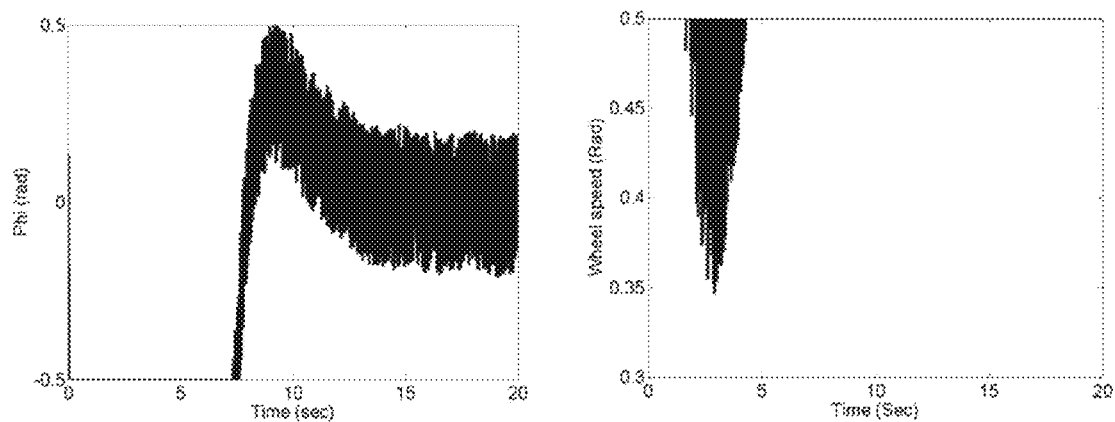
FIG. 16 depicts control signals corresponding to the trajectory of FIG. 14.

The robustness of the velocity controller is tested for both actuator noise and saturation. The environment, navigation field and controller used in this example are the same as the ones used in the previous example. A uniformly-distributed noise (−0.2, 0.2) is added to the control signal corresponding to the trajectory shown in FIG. 11. The control signal is then subjected to a saturation nonlinearity that limits the value of the control signal to the period (−0.5, 0.5) before applying it to the robot. The resulting trajectory is shown in FIG. 14 and the corresponding x and y components are shown in FIG. 15. The control signals are shown in FIG. 16. Despite the severity of the disturbance, the robot is still able to execute the behavior in the guidance field and move at a constant velocity along the centerline. The transient response was marginally affected and the path remains smooth.

Figure 17:
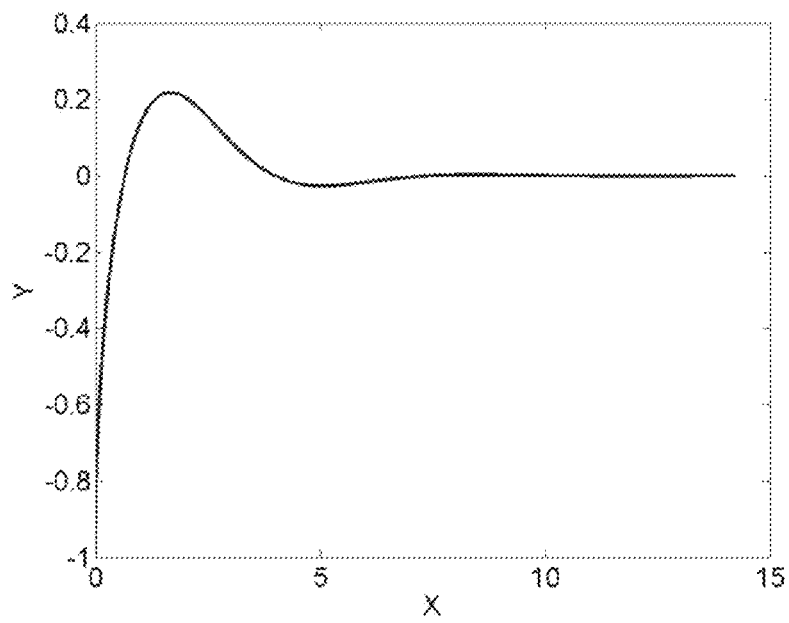
FIG. 17 depicts x and y components of the trajectory of FIG. 11 with the addition of parameter errors.
Figure 18:
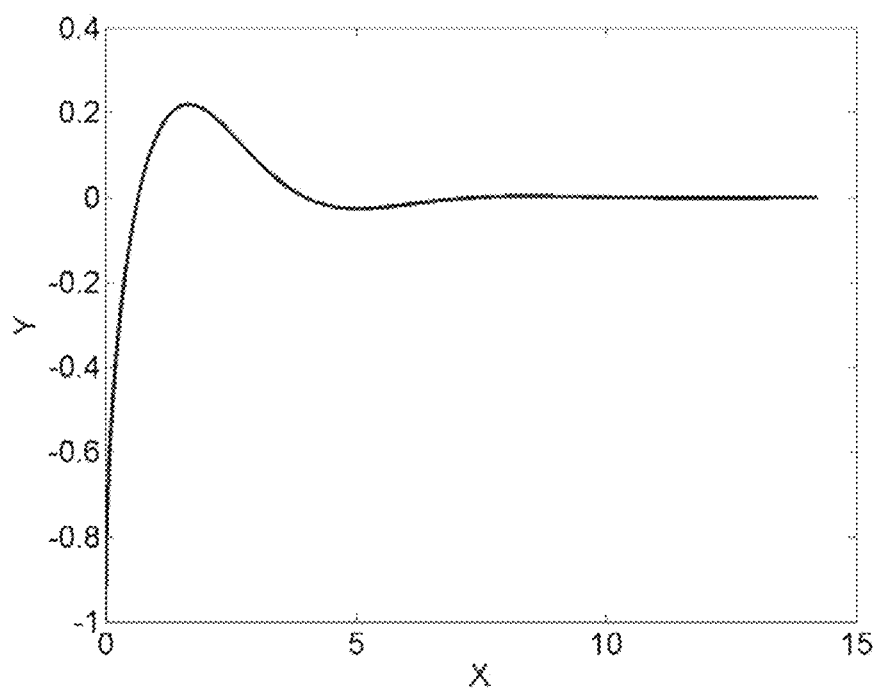
FIG. 18 depicts control signals corresponding to the trajectory of FIG. 17.

The robustness of the controller to uncertainty in the parameters is also tested. The actual FSR robot length is L=1 and the driving wheel radius is r=1. However, the parameters used by the controller are L=0.5 and r=1.5. The resulting trajectory is shown in FIG. 17 and the control signals are shown in FIG. 18. As can be seen, the robot is still able to actualize the guidance signal. The impact of the parameter error on the transients is quite marginal and the control signals are still well-behaved.

Figure 19:
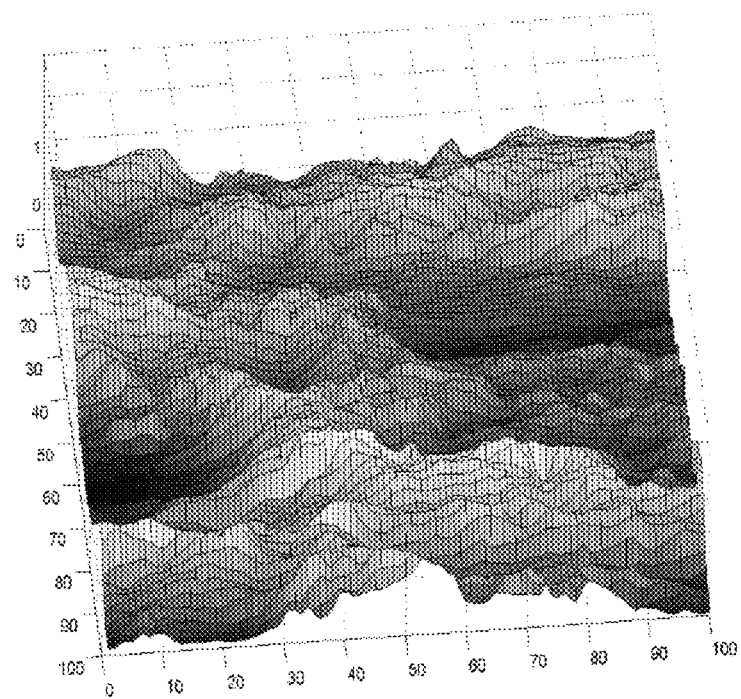
FIG. 19 depicts an environment described by an uncertainty map.
Figure 20:
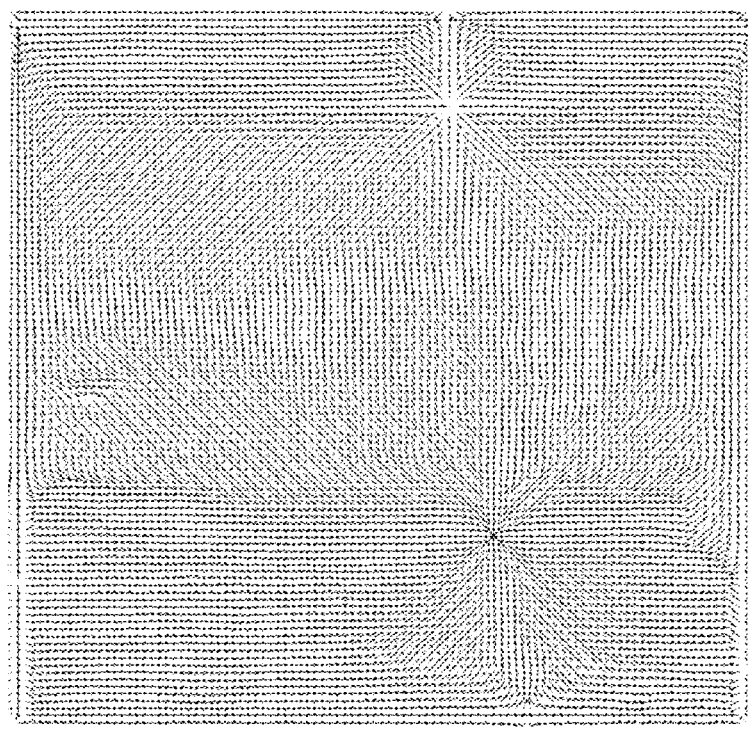
FIG. 20 depicts a guidance field corresponding to FIG. 19.
Figure 21:
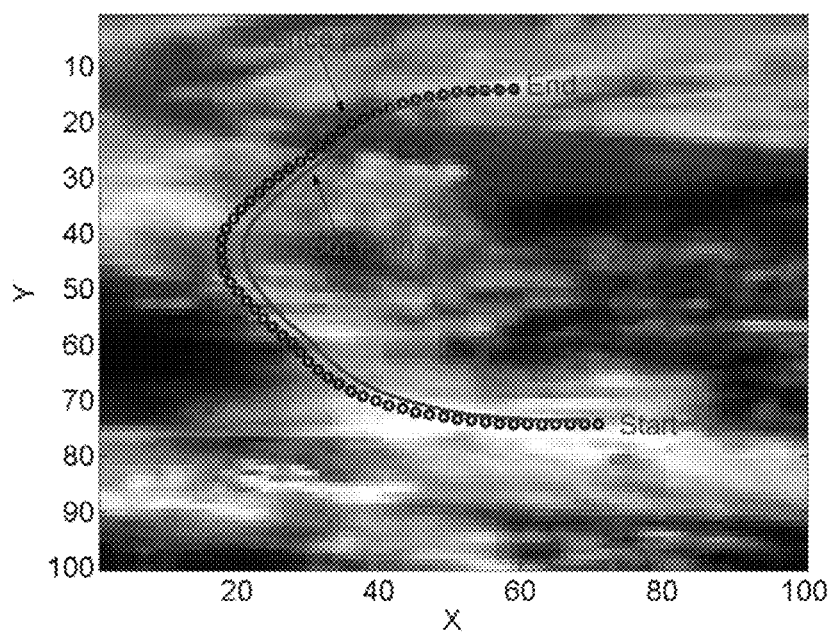
FIG. 21 depicts a front wheel steer robot (FSR) navigating in the environment described by the uncertainty map of FIG. 19.

In a third exemplary simulation, the ability of the controller to make a front wheel steer robot (FSR) navigate a complex environment is demonstrated. The environment is described by a scalar field (uncertainty map) representing the fitness of each point of space to support motion, as shown in FIG. 19. The same controller used in previous example is used with this example. The reference velocity field, shown in FIG. 20, is generated using the harmonic approach. The resulting trajectories from the reference velocity field and the robot are shown in FIG. 21. Both trajectories are superimposed on an intensity map that represents the fitness field describing the environment. The higher the brightness of the intensity map the better support the point in space has for motion. The dotted blue trajectory is laid by the harmonic planner and the solid red trajectory is laid by the robot.

Figure 22:
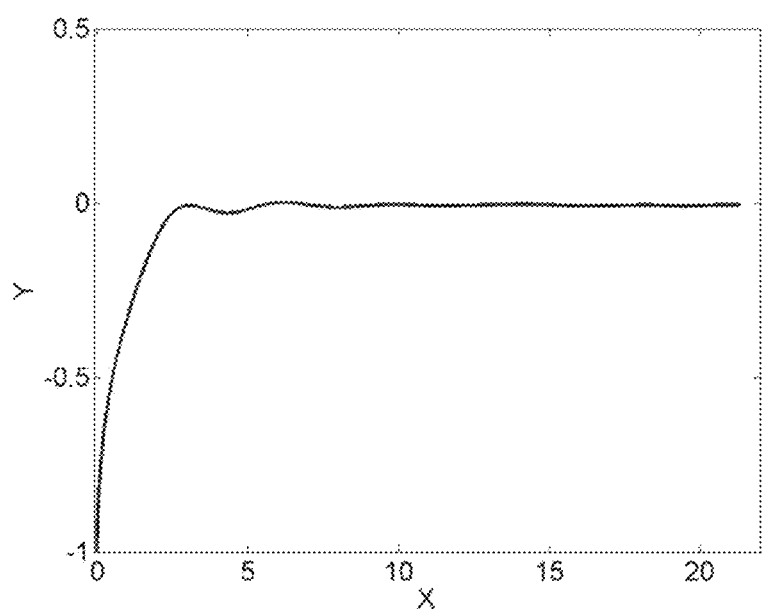
FIG. 22 depicts a trajectory of a differential drive robot (DDR) where KD1=1 and KD2=2, and selective damping is used.
Figure 23:
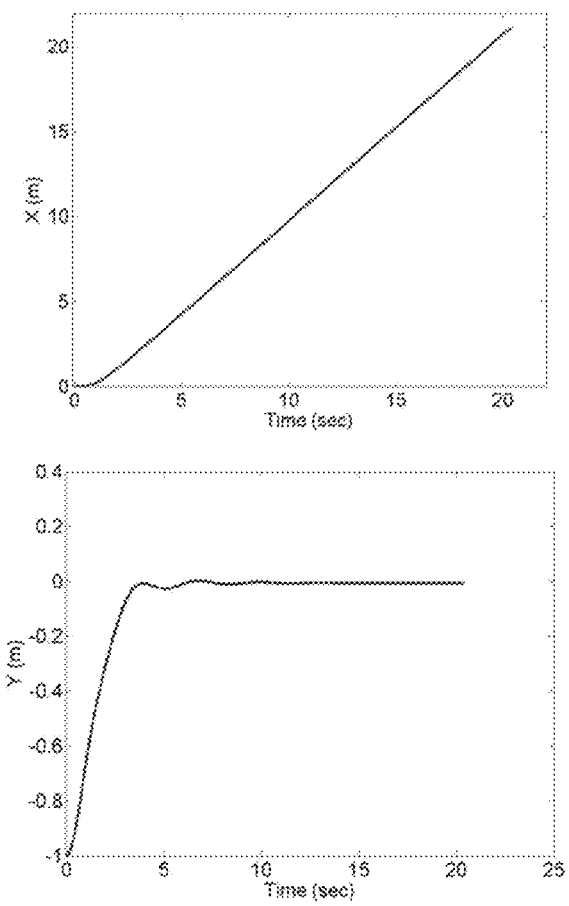
FIG. 23 depicts x and y components of the trajectory of FIG. 22.
Figure 24:
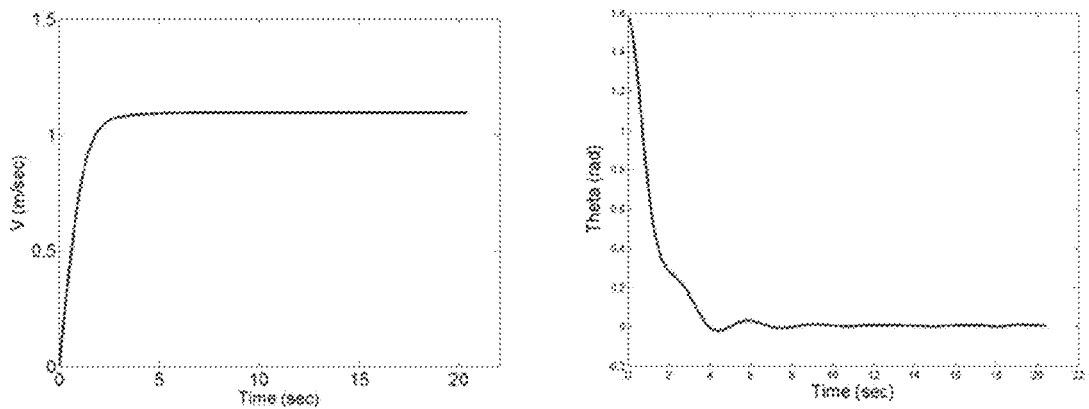
FIG. 24 depicts tangential and angular velocities associated with FIG. 22.
Figure 25:
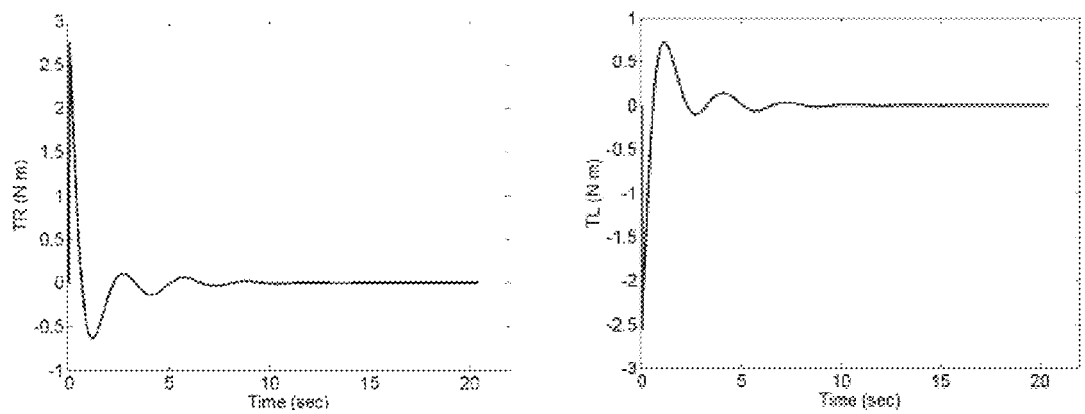
FIG. 25 depicts control torques associated with the trajectory of FIG. 22.

In a fourth exemplary simulation, the control structure of the torque controlled differential drive robot (DDR) is tested. The reference velocity field in FIG. 10 is used. The trajectory is shown in FIG. 22 and corresponding x and y components are shown in FIG. 23. The orientation and the tangential speed are shown in FIG. 24 and the well-behaved torques that are controlling the wheels of the robot are shown in FIG. 25.

Figure 26:
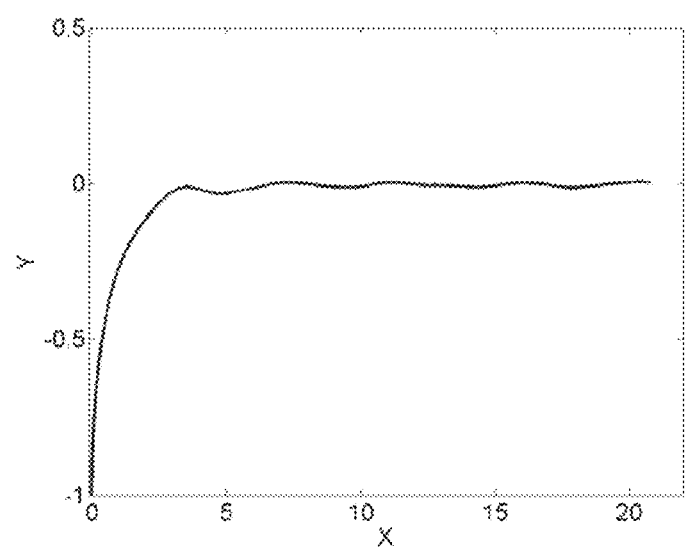
FIG. 26 depicts the trajectory of FIG. 22 with the addition of actuator noise.
Figure 27:
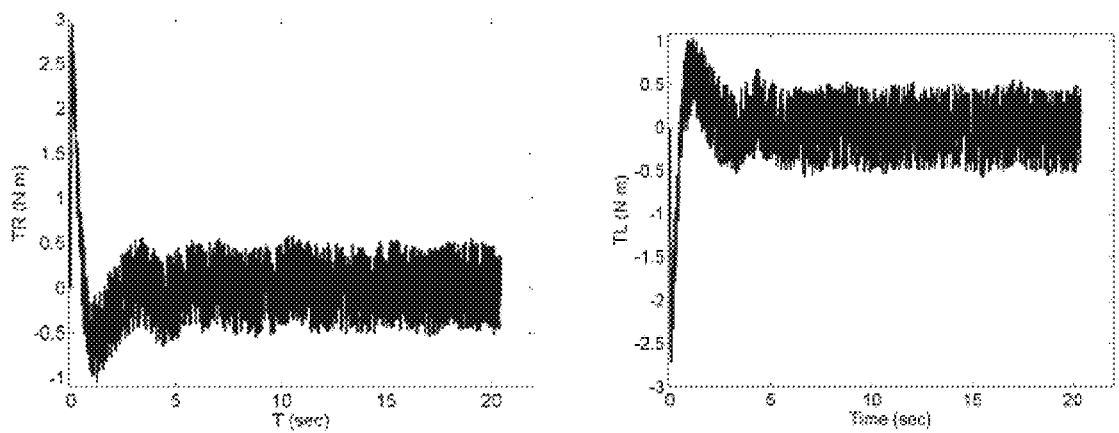
FIG. 27 depicts the control torques corresponding to the trajectory of FIG. 26.

In a fifth exemplary simulation, the robustness of the torque controlled differential drive robot (DDR) controller is tested. The same settings in the previous exemplary simulation are used. First, the robustness of the controller is tested in the presence of actuator noise by adding uniform noise in the period {−0.5, 0.5} to the control signal. The resulting trajectory is shown in FIG. 26 and the control signals are shown in FIG. 27. As can be seen, the impact of noise on the response is minimal.

Figure 28:
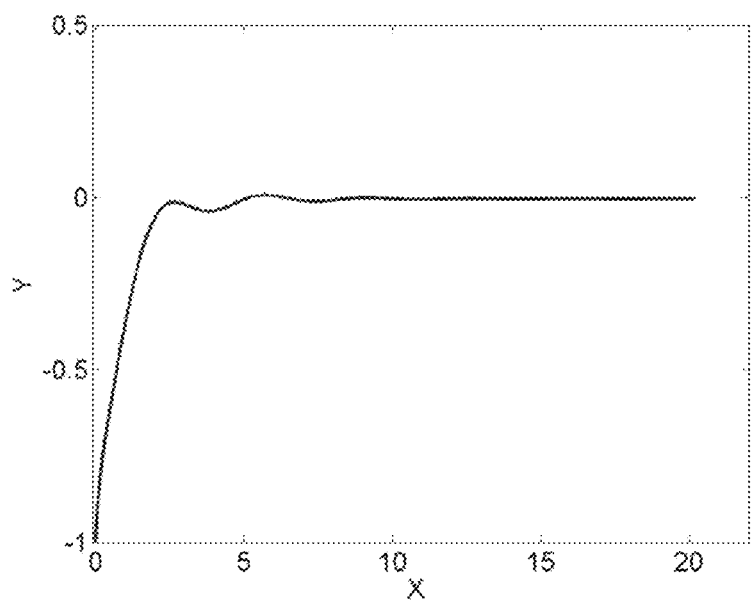
FIG. 28 depicts the trajectory of FIG. 22 with the addition of 85% actuator saturation.
Figure 29:
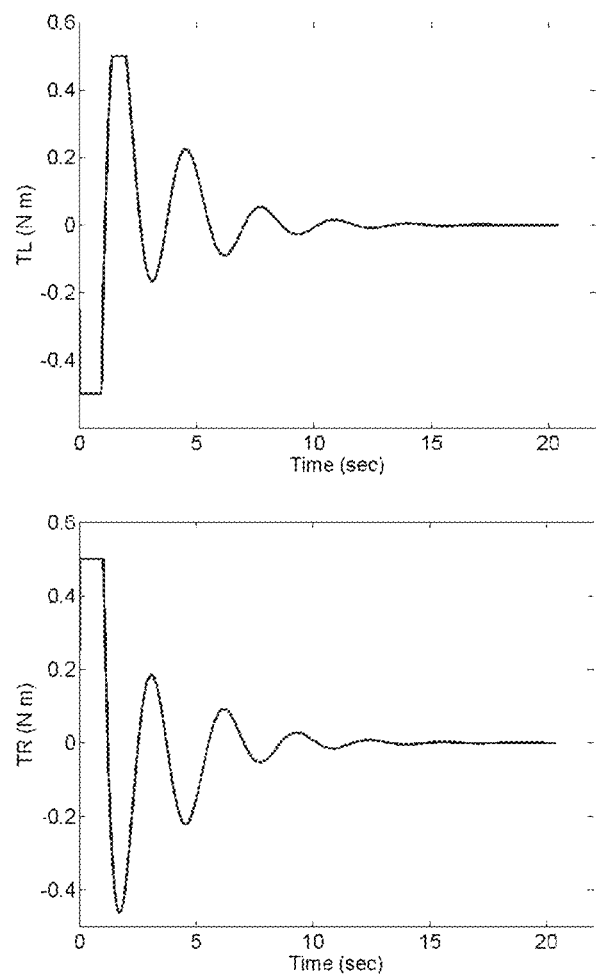
FIG. 29 depicts the control torques corresponding to the trajectory of FIG. 28.
Figure 30:
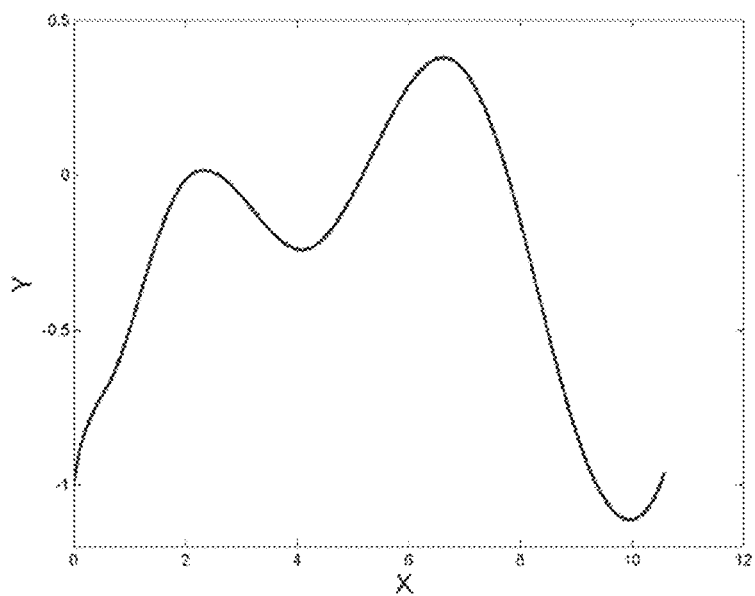
FIG. 30 depicts the trajectory of FIG. 22 with the addition of 95% actuator saturation.
Figure 31:
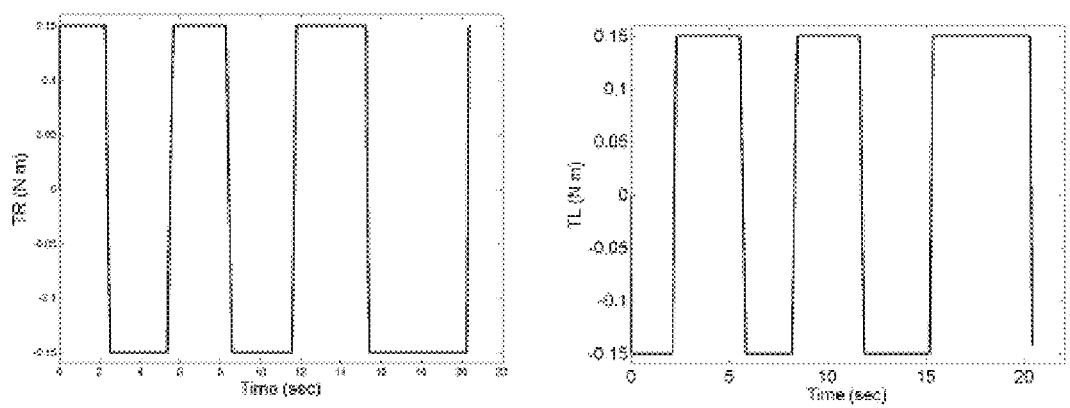
FIG. 31 depicts the control torques corresponding to the trajectory of FIG. 30.

The test is repeated to assess the ability of the controller to tolerate actuator saturation. The control signal is restricted to the period {−0.5, 0.5}. When compared to saturation-free maximum value of 2.8, this amounts to about 85% of the signal magnitude. The trajectory is shown in FIG. 28 and the control signals are in FIG. 29. As can be seen, other than slowing the response a little, the impact of this severe saturation nonlinearity is almost negligible. Comparable behavior was observed for high level of saturation. Abrupt change in the quality of the response is noticed at a 95% saturation {−0.15, 0.15}. The trajectory for the 95% saturation nonlinearity is shown in FIG. 30 and the corresponding control signal is shown in FIG. 31.

Figure 32:
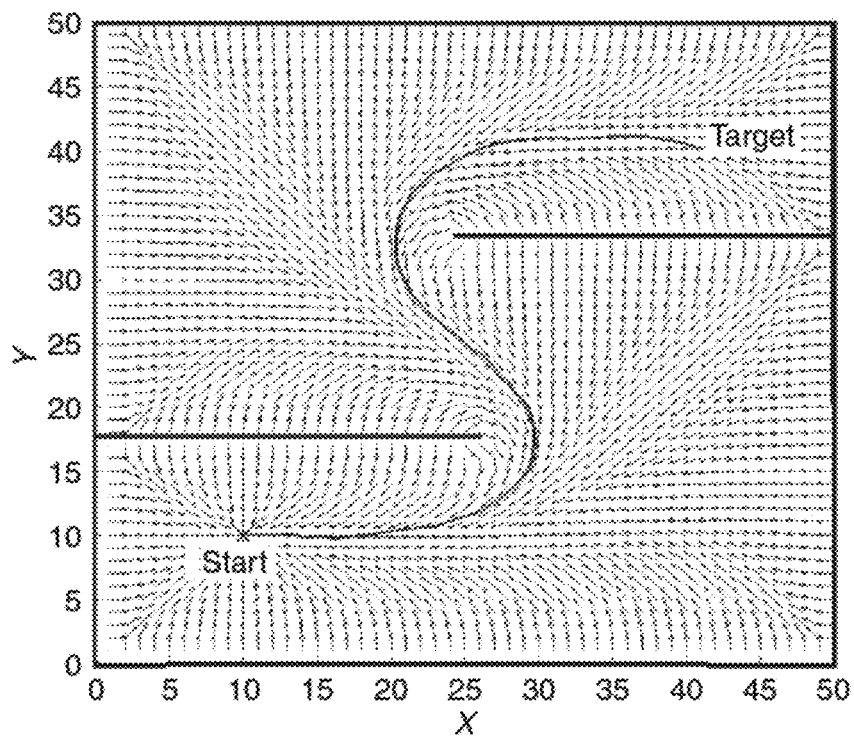
FIG. 32 depicts a velocity reference field.
Figure 33:
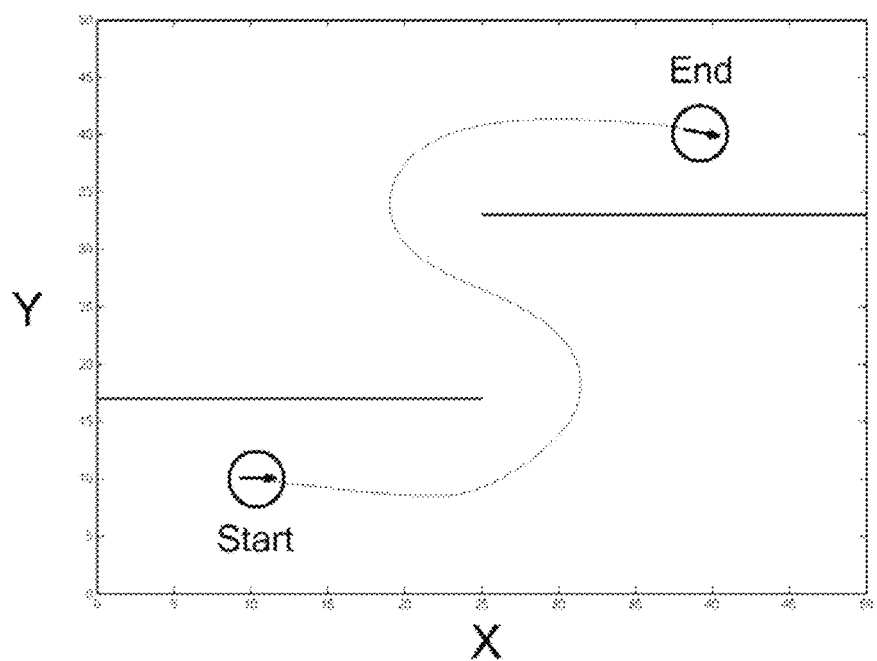
FIG. 33 depicts a trajectory of a differential drive robot (DDR) corresponding to FIG. 32.
Figure 34:
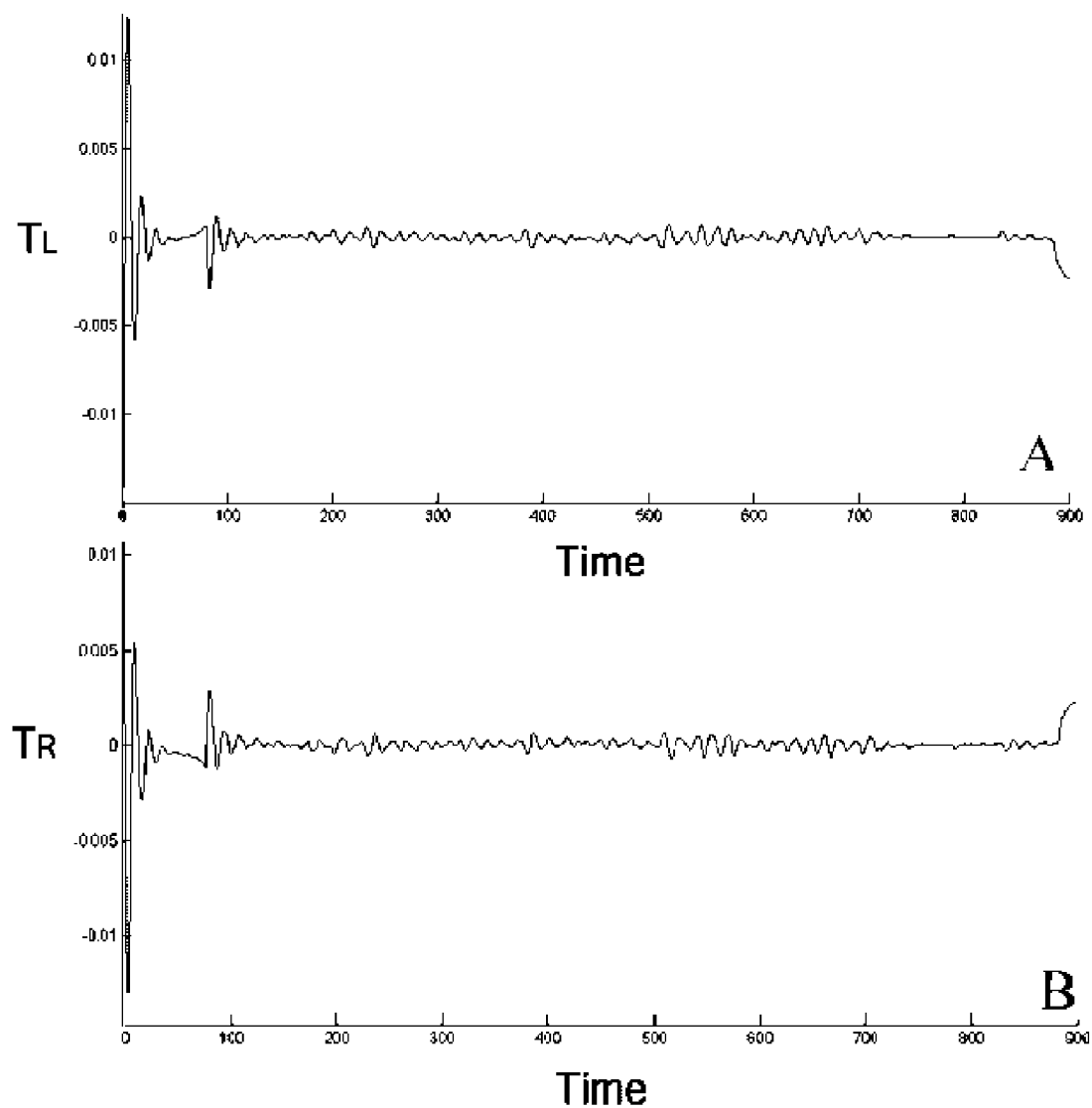
FIG. 34 depicts control torques corresponding to the trajectory of FIG. 33.

In a sixth exemplary simulation, the point-to-point motion capabilities of the torque controller for an involved harmonic velocity reference guidance field. The HPF gradient guidance field superimposed on the environment is shown in FIG. 32. The kinematic trajectory is also shown in FIG. 32. The initial conditions used are: $x(0)=y(0)=10$, $\theta(0)=0$. The final position is $x=y=40$ with no restrictions on orientation. The same controller in the previous exemplary simulation is used in this case. FIG. 33 shows the dynamic trajectory of the differential drive robot (DDR). The control signals are shown in FIG. 34. As can be seen the control signals are well-behaved.

In a seventh exemplary simulation, the robustness of the proposed controller in the presence of actuator saturation is tested. The magnitude of the torques ($T_R$ and $T_L$) is restricted not to exceed $T_m$ where $$T_m = C \cdot \max\left(\max_t(|T_R(t)|), \max_t(|T_L(t)|)\right)$$

Figure 35:
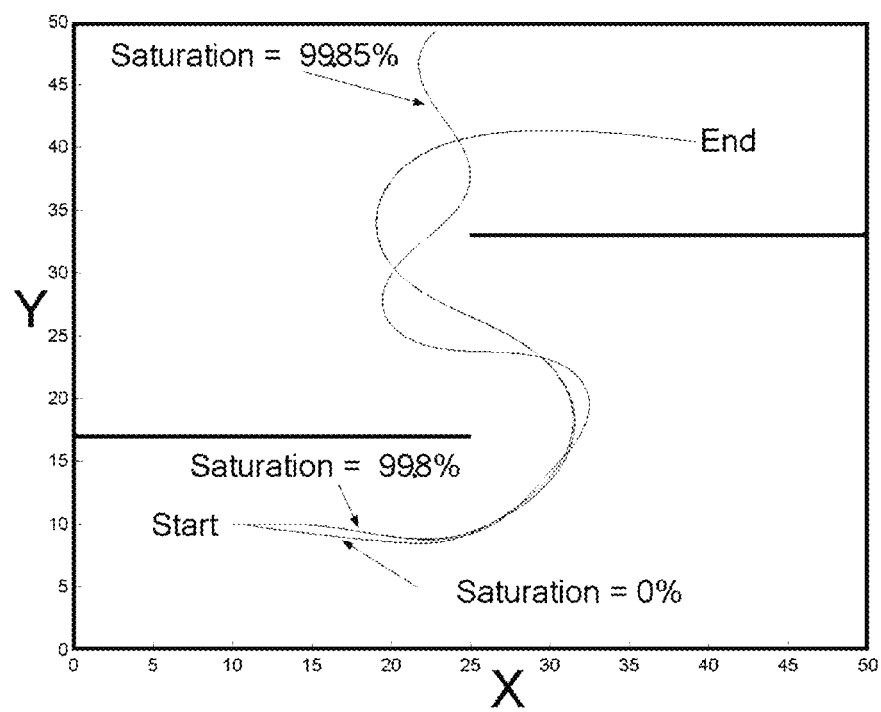
FIG. 35 depicts different trajectories of a differential drive robot (DDR) in response to the velocity reference field of FIG. 32 and actuator saturation.

$T_R$ and $T_L$ are the torques for then non-saturated case, C is a constant representing the percentage of saturation. The maximum torque for the non-saturated actuators is equal to 0.103 Nm. The controller showed remarkable robustness to saturation. The trajectory, as shown in FIG. 35, was virtually unaffected up to 99.8% saturation (i.e. C=0.002). A sudden breakdown in performance is observed beyond this limit.

Methods in related art do not fully acknowledge the issue of robustness and often assume that powerful actuators are employed and therefore saturation is not an issue. The methods in related art also often assume that due to manufacturing precision, parameter uncertainty does not need to be addressed. Lastly, the methods in related art also often assume that high quality hardware is used and therefore an issue with noise is not a problem. In contrast, the above exemplary simulations take these factors into account and show that the velocity controller and the torque controller of the present invention are robust despite the presence of noise, saturation, and/or uncertainty in the parameters.

Figure 36:
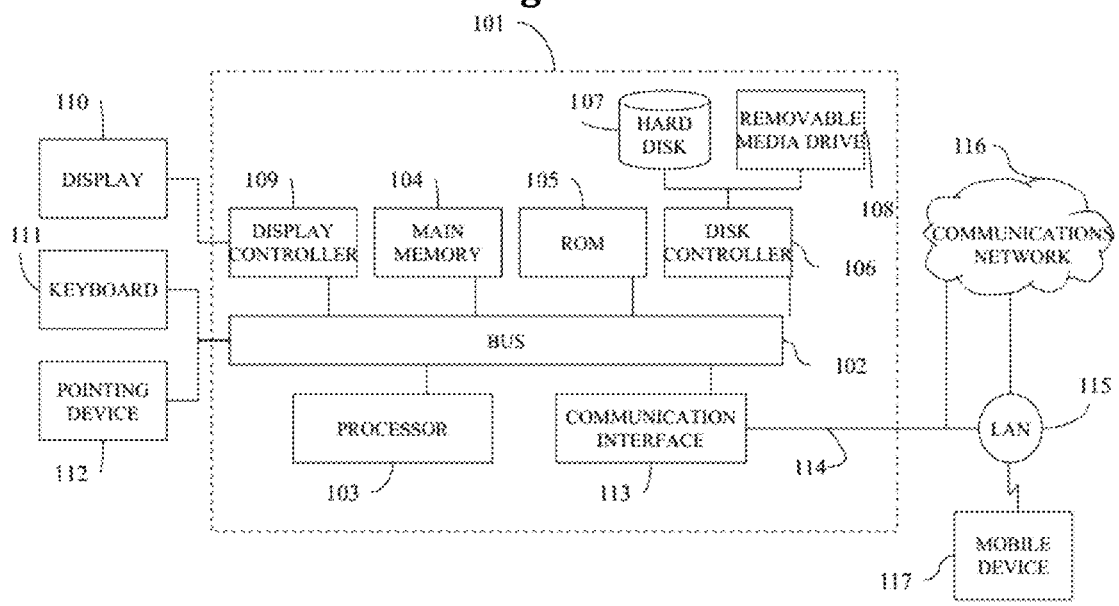
FIG. 36 depicts one embodiment of a robot controller for the mobile robot.

FIG. 36 illustrates a robot controller 101 upon which an embodiment of the present invention may be implemented. The robot controller 101 includes a bus 102 or other communication mechanism for communicating information, and a processor 103 coupled with the bus 102 for processing the information. The robot controller 101 also includes a main memory 104, such as a random access memory (RAM) or other dynamic storage device (e.g., dynamic RAM (DRAM), static RAM (SRAM), and synchronous DRAM (SDRAM)), coupled to the bus 102 for storing information and instructions to be executed by processor 103. For example, the plan, parameters of a robot, and instructions for the robot may be stored in main memory 104. In addition, the main memory 104 may be used for storing temporary variables or other intermediate information during the execution of instructions by the processor 103. The robot controller 101 further includes a read only memory (ROM) 105 or other static storage device (e.g., programmable ROM (PROM), erasable PROM (EPROM), and electrically erasable PROM (EEPROM)) coupled to the bus 102 for storing static information and instructions for the processor 103.

The robot controller 101 may also include a disk controller 106 coupled to the bus 102 to control one or more storage devices for storing information and instructions, such as a magnetic hard disk 107, and a removable media drive 108 (e.g., floppy disk drive, read-only compact disc drive, read/write compact disc drive, compact disc jukebox, tape drive, and removable magneto-optical drive). The storage devices may be added to the robot controller 101 using an appropriate device interface (e.g., small computer system interface (SCSI), integrated device electronics (IDE), enhanced-IDE (E-IDE), direct memory access (DMA), or ultra-DMA).

The robot controller 101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The robot controller 101 may also include a display controller 109 coupled to the bus 102 to control a display 110, such as a cathode ray tube (CRT) or a liquid crystal display (LCD), for displaying information to a robot operator. The computer system includes input devices, such as a keyboard 111 and a pointing device 11, for interacting with a robot operator and providing information to the processor 103. The pointing device 11, for example, may be a mouse, a trackball, or a pointing stick for communicating direction information, and command selections to the processor 103 and for controlling cursor movement on the display 110. In addition or in the alternative, a touch screen (not illustrated) may be provided to receive inputs, direction information, and command selections. Additionally, a printer may provide printed listings of data stored and/or generated by the controller 101.

The robot controller 101 performs a portion or all of the processing steps of the invention in response to the processor 103 executing one or more sequences of one or more instructions contained in a memory, such as the main memory 104. Such instructions may be read into the main memory 104 from another computer readable medium, such as a hard disk 107 or a removable media drive 108. One or more processors in a multi-processing arrangement may also be employed to execute the sequences of instructions contained in main memory 104. In alternative embodiments, hard-wired circuitry may be used in place of or in combination with software instructions. Thus, embodiments are not limited to any specific combination of hardware circuitry and software.

As stated above, the robot controller 101 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the robot controller 101, for driving a device or devices for implementing the invention, and for enabling the robot controller 101 to interact with a human user (e.g., receive plan inputs from user or provide operating parameter and outputs to user). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 103 for execution. A computer readable medium may take many forms, including but not limited to, non-volatile media, volatile media, and transmission media. Non-volatile media includes, for example, optical, magnetic disks, and magneto-optical disks, such as the hard disk 107 or the removable media drive 108. Volatile media includes dynamic memory, such as the main memory 104. Transmission media includes coaxial cables, copper wire and fiber optics, including the wires that make up the bus 102. Transmission media also may also take the form of acoustic or light waves, such as those generated during radio wave and infrared data communications.

Various forms of computer readable media may be involved in carrying out one or more sequences of one or more instructions to processor 103 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the robot controller 101 may receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 104, from which the processor 103 retrieves and executes the instructions. The instructions received by the main memory 104 may optionally be stored on storage device 107 or 108 either before or after execution by processor 103.

The robot controller 101 also includes a communication interface 113 coupled to the bus 102. The communication interface 113 provides a two-way data communication coupling to a network link 114 that is connected to, for example, a local area network (LAN) 115, or to another communications network 116 such as the Internet. For example, the communication interface 113 may be a network interface card to attach to any packet switched LAN. As another example, the communication interface 113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 113 sends and receives electrical, electromagnetic or optical signals that carry digital data streams representing various types of information.

The network link 114 typically provides data communication through one or more networks to other data devices. For example, the network link 114 may provide a connection to another computer through a local network 115 (e.g., a LAN) or through equipment operated by a service provider, which provides communication services through a communications network 116. The local network 114 and the communications network 116 use, for example, electrical, electromagnetic, or optical signals that carry digital data streams, and the associated physical layer (e.g., CAT 5 cable, coaxial cable, optical fiber, etc). The signals through the various networks and the signals on the network link 114 and through the communication interface 113, which carry the digital data to and from the robot controller 101 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The robot controller 101 can transmit and receive data, including program code, through the network(s) 115 and 116, the network link 114 and the communication interface 113. Moreover, the network link 114 may provide a connection through a LAN 115 to a mobile device 117 such as a personal digital assistant (PDA) laptop computer, or cellular telephone.

In one embodiment, the robot controller 101 may receive instructions or commands stored on the hard disk 117 and/or stored on the removable media drive 108. In one embodiment, the robot controller 101 may receive instructions or commands stored on a remote location that is transferred to the robot controller 101 via the network 114. The instructions or commands may include a plan that contains a reference velocity field vector of a robot. The robot controller 101 may receive information or signals from at least one input sensor of the robot via the communication interface 113. The input sensor may provide the robot controller 101 with one or more of the following signals: angular speed of a left wheel of the robot ($\omega_L$), angular speed of a right wheel of a robot ($\omega_R$), tangential velocity of the robot (v), angular speed of the robot ($\omega$), angular speed of rear wheels of a robot ($\omega_h$), and/or steering angle of the front wheel ($\Phi$). The processor 103 may process the information or signals, perform calculations to determine a synchronization signal, and perform calculations to determine a control signal. Additionally, the processor 103 may generate a control signal to synchronize an actual velocity and/or an actual torque of the robot to navigate the robot according to the plan. The generated control signal may be transmitted to another component of the robot, such as a motor, to execute the synchronization of the actual velocity and/or actual torque.

It is understood that the joint planning and control of the mobile robot of the present disclosure is not limited to the particular embodiments disclosed herein, but embraces much modified forms thereof that are within the scope of the following claims.

The invention claimed is:

1. A method for controlling a position of a robot, the method comprising:
   transferring a plan to a controller including a processor and memory, storing the plan in the memory, the plan including a reference velocity field vector;
   transferring parameters of the robot to the memory of the controller, the parameters including kinematics of motion of the robot;
   calculating, in the processor of the controller, a synchronization signal, S, based on the parameters of the robot;
   calculating, in the processor of the controller, a control signal, U, based on the synchronization signal S; and
   generating, in the processor of the controller, the control signal, U, to synchronize an actual velocity of the robot to navigate the robot according to the plan.

2. The method for controlling a position of the robot according to claim 1,
   wherein the robot is a front wheel steered robot, and
   wherein transferring parameters of the robot to the controller includes:
      transferring, to the controller, a distance, L, between a front wheel of the robot and an axle of rear wheels of the robot,
      transferring, to the controller, an angular speed, $\omega_h$, of the rear wheels of the robot, and
      transferring, to the controller, a steering angle, $\phi$, of the front wheel of the robot.

3. The method for controlling a position of the robot according to claim 2, wherein kinematics of motion of the robot are described as:

$$\begin{bmatrix} \dot{x} \\ \dot{y} \\ \dot{\theta} \end{bmatrix} = \begin{bmatrix} \cos(\theta) & 0 \\ \sin(\theta) & 0 \\ 0 & 1 \end{bmatrix} \begin{bmatrix} v \\ \omega \end{bmatrix}, \begin{bmatrix} v \\ \omega \end{bmatrix} = \begin{bmatrix} r \cdot \omega_h \\ r \cdot \omega_h \cdot \dfrac{\tan(\phi)}{L} \end{bmatrix}, \begin{bmatrix} \omega_h \\ \phi \end{bmatrix} = \begin{bmatrix} v/r \\ \tan^{-1}((\omega \cdot L)/v) \end{bmatrix}.$$

4. The method for controlling a position of the robot according to claim 3, wherein the calculating is performed to determine the synchronization signal, S, by:

$$S = \begin{bmatrix} s_1 \\ s_2 \end{bmatrix} = \begin{bmatrix} K1 \cdot |\dot{X}d| \cdot \cos(\arg(\dot{X}d) - \theta) \\ K2 \cdot (\arg(\dot{X}d) - \theta) \end{bmatrix}.$$

5. The method for controlling a position of the robot according to claim 4, wherein the calculating is performed to determine the control signal, U, by:

$$U = \begin{bmatrix} \omega_h \\ \phi \end{bmatrix} = \begin{bmatrix} s_1 \\ \tan^{-1}(s_2/(L \cdot s_1)) \end{bmatrix}.$$

6. The method for controlling a position of the robot according to claim 1,
   wherein the robot is a differential drive robot including at least two wheels, and
   wherein transferring parameters of the robot to the controller includes:
      transferring, to the controller, a radius, r, of the at least two wheels of the robot,
      transferring, to the controller, an angular speed, $\omega_L$, of a first wheel of the at least two wheels,
      transferring, to the controller, an angular speed, $\omega_R$, of a second wheel of the at least two wheels,
      transferring, to the controller, a tangential velocity, v, of the robot, and
      transferring, to the controller, an angular speed, $\omega$, of the robot.

7. The method for controlling a position of the robot according to claim 5, wherein kinematics of motion of the robot are described as:

$$\begin{bmatrix} \dot{x} \\ \dot{y} \\ \dot{\theta} \end{bmatrix} = \begin{bmatrix} \cos(\theta) & 0 \\ \sin(\theta) & 0 \\ 0 & 1 \end{bmatrix} \begin{bmatrix} v \\ \omega \end{bmatrix}, \begin{bmatrix} v \\ \omega \end{bmatrix} = \begin{bmatrix} \dfrac{r}{2} & \dfrac{r}{2} \\ \dfrac{r}{W} & \dfrac{-r}{W} \end{bmatrix} \begin{bmatrix} \omega_R \\ \omega_L \end{bmatrix}, \begin{bmatrix} \omega_R \\ \omega_L \end{bmatrix} = \begin{bmatrix} \dfrac{1}{r} & \dfrac{W}{2r} \\ \dfrac{1}{r} & \dfrac{-W}{2r} \end{bmatrix} \begin{bmatrix} v \\ \omega \end{bmatrix}.$$

8. The method for controlling a position of the robot according to claim 7, wherein the calculating is performed to determine the synchronization signal, S, by:

$$S = \begin{bmatrix} s_1 \\ s_2 \end{bmatrix} = \begin{bmatrix} K1 \cdot |\dot{X}d| \cdot \cos(\arg(\dot{X}d) - \theta) \\ K2 \cdot (\arg(\dot{X}d) - \theta) \end{bmatrix}.$$

9. The method for controlling a position of the robot according to claim 8, wherein the calculating is performed to determine the control signal, U, by:

$$U = \begin{bmatrix} \omega_R \\ \omega_L \end{bmatrix} = \begin{bmatrix} \dfrac{1}{r} & \dfrac{W}{2r} \\ \dfrac{1}{r} & \dfrac{-W}{2r} \end{bmatrix} \begin{bmatrix} s_1 \\ s_2 \end{bmatrix}.$$

10. The method for controlling a position of the robot according to claim 1,
wherein the robot is a differential drive robot including at least two wheels, and
wherein transferring parameters of the robot to the controller includes:
transferring, to the controller, a mass, W, of the robot;
transferring, to the controller, a first torque, TL, applied to a left wheel of the at least two wheels; and
transferring, to the controller, a second torque, TR, applied to a right wheel of the at least two wheels.

11. The method for controlling a position of the robot according to claim 10, wherein a first actuation stage of motion is described as:

$$\begin{bmatrix} \dot{x} \\ \dot{y} \\ \dot{\theta} \end{bmatrix} = \begin{bmatrix} \cos(\theta) & 0 \\ \sin(\theta) & 0 \\ 0 & 1 \end{bmatrix} \begin{bmatrix} \dot{v} \\ \dot{\omega} \end{bmatrix} + \begin{bmatrix} -\sin(\theta)\dot{\theta} & 0 \\ \cos(\theta)\dot{\theta} & 0 \\ 0 & 0 \end{bmatrix} \begin{bmatrix} v \\ \omega \end{bmatrix}.$$

12. The method for controlling a position of the robot according to claim 11, wherein a second actuation stage of motion is described as:

$$\begin{bmatrix} \dot{v} \\ \dot{\omega} \end{bmatrix} = \dfrac{1}{M} \begin{bmatrix} \dfrac{1}{r} & \dfrac{1}{r} \\ \dfrac{-4 \cdot r}{W^3} & \dfrac{4 \cdot r}{W^3} \end{bmatrix} \begin{bmatrix} T_R \\ T_L \end{bmatrix}.$$

13. The method for controlling a position of the robot according to claim 12,
wherein the calculating is performed to determine the synchronization signal, S, by:

$$S = \begin{bmatrix} s_1 \\ s_2 \end{bmatrix} = \begin{bmatrix} K1 \cdot (|\dot{X}d| - v) \cdot \cos(\arg(\dot{X}d) - \theta) \\ K2 \cdot (\arg(\dot{X}d) - \theta) \end{bmatrix},$$

where, K1 and K2 are positive constants.

14. The method for controlling a position of the robot according to claim 13,
wherein the calculating is performed to determine a damping force, $S_D$, by:

$$S_D = \begin{bmatrix} KD1 \cdot \eta_1(\dot{X}d, \dot{X}) & 0 \\ 0 & KD2 \cdot \eta_2(\dot{X}d, \dot{X}) \end{bmatrix} \begin{bmatrix} v \\ \omega \end{bmatrix},$$

where $$\eta_1 = 1 - \dfrac{\dot{X}^t(\dot{X}d)}{\|\dot{X}\|\|\dot{X}d\|} = 1 - \cos(\arg(\dot{X}d) - \theta), \text{ and } \eta_2 = 1.$$

15. The method for controlling a position of the robot according to claim 14, wherein the calculating is performed to determine the control signal, U, by:

$$U = \begin{bmatrix} T_R \\ T_L \end{bmatrix} = M \begin{bmatrix} \dfrac{1}{r} & \dfrac{1}{r} \\ \dfrac{-4 \cdot r}{W^3} & \dfrac{4 \cdot r}{W^3} \end{bmatrix}^{-1} (S - S_D).$$

16. The method for controlling a position of the robot according to claim 1, wherein the control signal is a velocity synchronizing signal.

17. The method for controlling a position of the robot according to claim 1, wherein the control signal is a torque synchronizing signal.

* * * * *